US012111822B2

(12) United States Patent
Wang et al.

(10) Patent No.: US 12,111,822 B2
(45) Date of Patent: Oct. 8, 2024

(54) DATABASE RACE CONDITION PREVENTION

(71) Applicant: Stripe, Inc., South San Francisco, CA (US)

(72) Inventors: Peter Wang, Seattle, WA (US); Alexander Thiemann, San Francisco, CA (US); Adam Eagle, San Francisco, CA (US); Hongshan Zhou, San Francisco, CA (US); Ji Huang, Bothell, WA (US)

(73) Assignee: Stripe, Inc., South San Francisco, CA (US)

( * ) Notice: Subject to any disclaimer, the term of this patent is extended or adjusted under 35 U.S.C. 154(b) by 136 days.

(21) Appl. No.: 17/489,062

(22) Filed: Sep. 29, 2021

(65) Prior Publication Data
US 2023/0114105 A1 Apr. 13, 2023

(51) Int. Cl.
G06F 16/00 (2019.01)
G06F 16/23 (2019.01)
G06Q 10/087 (2023.01)

(52) U.S. Cl.
CPC ...... *G06F 16/2379* (2019.01); *G06F 16/2343* (2019.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 9,336,549 B2* | 5/2016 | Argue | ........... | G06Q 10/087 |
| 9,805,334 B2* | 10/2017 | Overhultz | ........... | G06Q 10/087 |
| 10,163,140 B2* | 12/2018 | Robinson | ........... | G06Q 30/06 |
| 10,339,542 B2* | 7/2019 | Cicchitto | ........... | G06Q 30/02 |
| 11,205,213 B2* | 12/2021 | Turner | ........... | G06Q 30/0633 |
| 11,222,380 B2* | 1/2022 | Koch | ........... | G06Q 30/0633 |
| 2002/0069082 A1* | 6/2002 | Choe | ........... | G06Q 10/0833 705/26.1 |
| 2002/0128918 A1* | 9/2002 | Chao | ........... | G06Q 10/087 705/28 |
| 2007/0124217 A1* | 5/2007 | Terry | ........... | G06Q 10/00 705/28 |

(Continued)

FOREIGN PATENT DOCUMENTS

WO WO-02086650 A2 * 10/2002 ............ G06Q 30/02

OTHER PUBLICATIONS

Frap et al: "Record locking", Wikipedia, Nov. 3, 2020 (Nov. 3, 2020), pp. 1-3, XP055982905, Retrieved from the Internet: URL:https://en.wikipedia.org/w/index.php?title=Record_locking&oldid=986904480 [retrieved on Nov. 18, 2022] p. 1 section "Exclusive locks".

(Continued)

*Primary Examiner* — Debbie M Le
(74) *Attorney, Agent, or Firm* — Foley & Lardner LLP

(57) ABSTRACT

A method comprises: setting an first entry and an second entry in a database; receiving a first online transaction; responsive to determining a lock of the database is in progress, suspending the first online transaction; updating the first entry; removing the lock; receiving a second online transaction; responsive to determining that the first field is greater than zero, decrementing the first field by an amount indicated in the second online transaction; and responsive to determining the second entry is greater than zero, decrementing the second entry.

20 Claims, 7 Drawing Sheets

(56) References Cited

U.S. PATENT DOCUMENTS

| | | | | |
|---|---|---|---|---|
| 2011/0125592 A1* | 5/2011 | Mesaros | ............ | G06Q 30/0258 |
| | | | | 705/14.72 |
| 2013/0013368 A1* | 1/2013 | Grant, Jr. | ........... | G06Q 30/0603 |
| | | | | 705/7.12 |
| 2015/0363880 A1* | 12/2015 | Droste | ............... | G06Q 30/0601 |
| | | | | 705/37 |
| 2022/0083943 A1* | 3/2022 | He | ................... | G06Q 10/06313 |
| 2022/0245119 A1* | 8/2022 | Timpe | ................. | G06F 16/2343 |
| 2022/0358570 A1* | 11/2022 | Agrawal | ............ | G06Q 30/0643 |

OTHER PUBLICATIONS

International Preliminary Report on Patentability for PCT App. PCT/US2022/041569 dated Apr. 2, 2024 (8 pages).
International Search Report and Written Opinion on PCT App. PCT/US2022/041569 dated Nov. 28, 2022 (8 pages).

\* cited by examiner

DATABASE RACE CONDITION PREVENTION

FIELD

The subject matter disclosed herein generally relates to the technical field of databases and more specifically, preventing database race conditions.

BACKGROUND

A race condition occurs when a device or system attempts to perform two or more operations simultaneously, but the operations must be done in sequence to be handled correctly. In the field of databases, a race condition can occur when two separate programs or other entities attempts to write simultaneously to a same single entry in the database instead of sequentially. This can cause data corruption, which is undesirable in a database.

BRIEF DESCRIPTION OF THE SEVERAL VIEWS OF THE DRAWINGS

Some embodiments are illustrated by way of example and not limitation in the views of the accompanying drawing.

DETAILED DESCRIPTION

Figure 1:
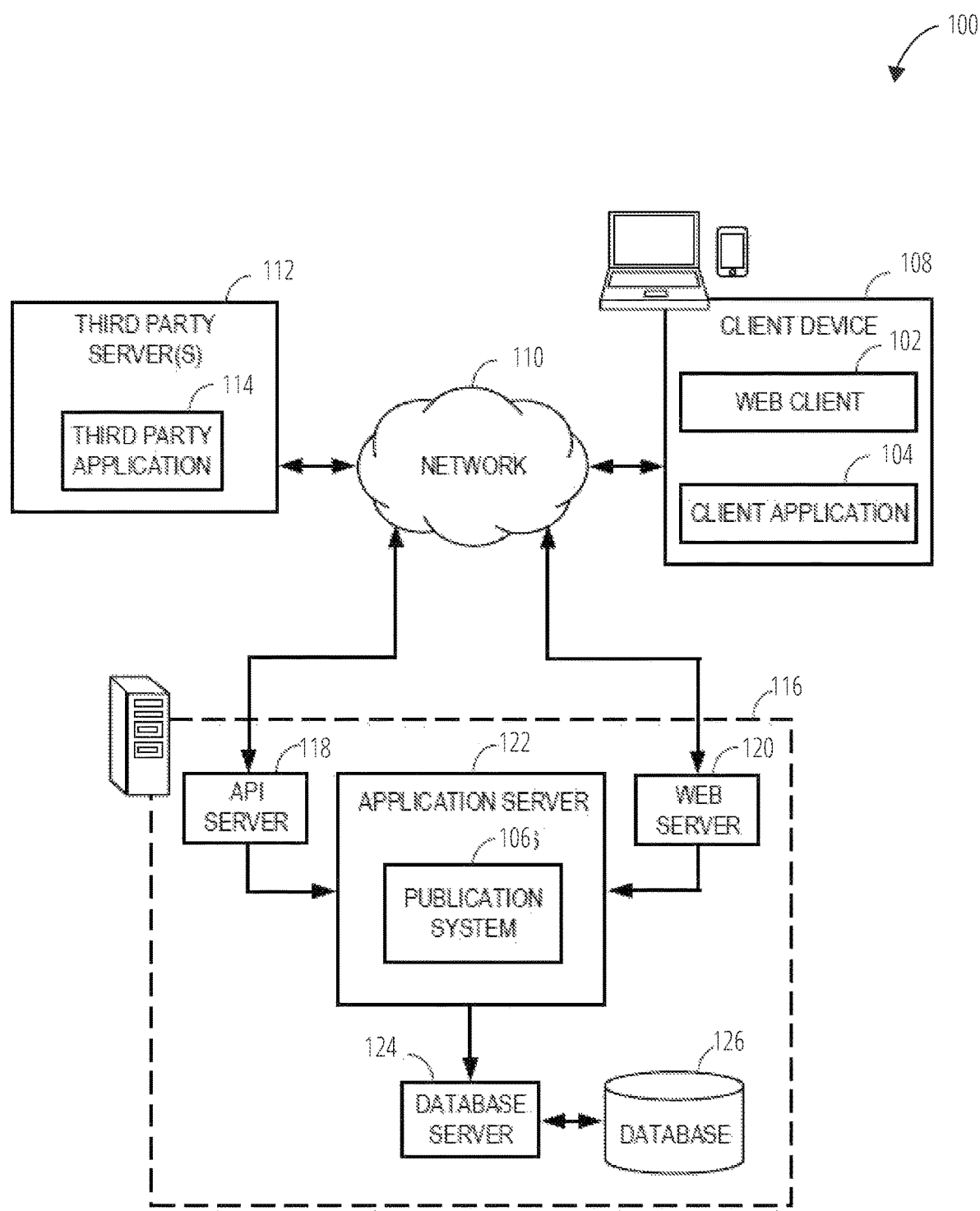
FIG. 1 is a block diagram illustrating a networked system, according to some example embodiments.

"Carrier Signal", in this context, refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device", in this context, refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device", in this context, refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (IxRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component", in this context, refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor", in one context, refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

In another context, a "Processor" (e.g., processor 514 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association"), in this context, refers to financial payment networks such as Visa®, MasterCard®, American Express®, Diners Club®, JCB®, and China Union-Pay®.

"Acquiring Bank" or "Acquirer", in this context, refers to a bank or financial institution that accepts credit and/or debit card payments from affiliated card networks for products or services on behalf of a merchant or payment service provider.

"Card Issuing Bank" or "Issuing Bank", in this context, refers to a bank that offers card network or association-branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code), while other information might not be (e.g., zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant", in this context, refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site", in this context, refers to an e-commerce site or portal (e.g., website, or mobile app) of the merchant. In some figures, the merchant (e.g., a merchant 502 of FIG. 5) and merchant servers (e.g., merchant servers 506 of FIG. 5) are associated with the merchant site. The merchant site is associated with a client-side application and a server-side application. In one example embodiment, the merchant site includes the merchant servers 506 of FIG. 5, and the server-side application executes on the merchant servers 506.

"Payment Processor", in this context, (e.g., a payment processor 510 in FIG. 5) refers to an entity or a plurality of entities that facilitate a transaction, for example between a merchant and a customer's electronic device. With reference to a high-level description illustrated in FIG. 5, in some examples described more fully below, the payment processor includes selected functionality of both the payment processor 510 and processor 514/card networks 516. For example, the payment processor 510 creates tokens and maintains and verifies publishable (non-secret) keys and secret keys. In the illustrated example, the processor 514/card networks 516 are involved in authorizing or validating payment information. In one example embodiment, the payment processor 510 and the processor 514/card networks 516 function together to authorize and validate payment information, issue a token, and settle any charges that are made. Accordingly, in this embodiment, "payment processor" refers to the functionality of the payment processor 510 and the functionality of the processor 514/card networks 516. In another example embodiment, wherein step (3) in the high-level description is not performed, and the payment processor 510 performs its own verification before issuing a token, the processor 514/card networks 516 are still used for settling any charges that are made, as described in step (7). Accordingly, in this embodiment, "payment processor" may refer only to the functionality of the payment processor 510 with respect to issuing tokens. Further, in the example arrangement shown, the payment processor 510, the processor 514, and the card networks 516 are shown as separate entities. In some examples, their respective functions may be performed by two entities, or even just one entity, with the entities themselves being configured accordingly.

"Native Application" or "native app", in this context, refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "user", "cardholder", and "consumer" are used interchangeably unless the context indicates otherwise.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 510) that provides a number of functions and services to the client application 104 that accesses the networked system 116. The client application 104 also provides a number of interfaces described herein, which present output of push payment decision routing to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is, of course, not limited to such an architecture, and could equally well find application in a distributed, or peer-to-peer, architecture system, for example. The publication system 106 could also be implemented as a standalone software program, which does not necessarily have networking capabilities.

Figure 2:
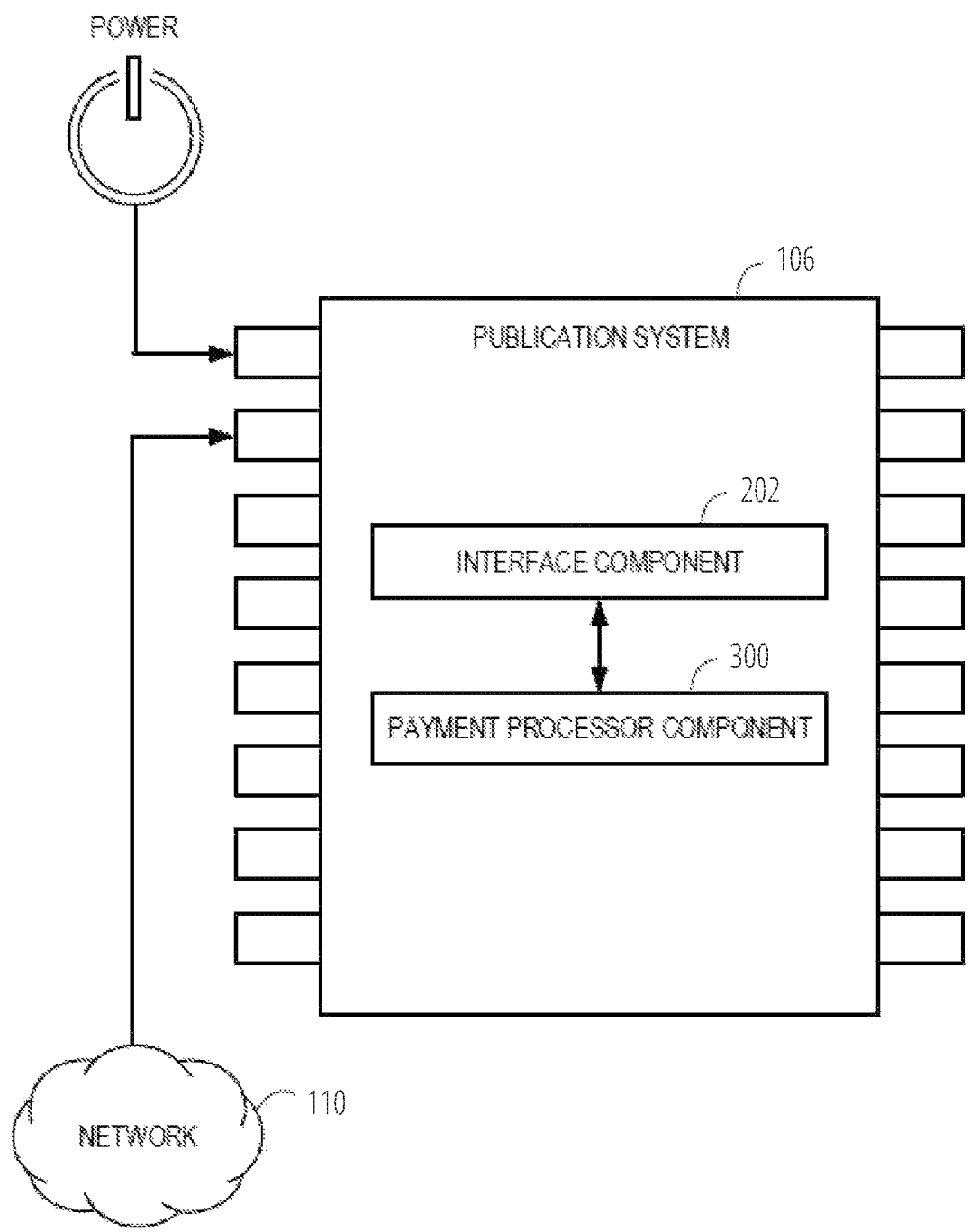
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 202 by which the publication system 106 communicates (e.g., over a network 110) with other systems within the SaaS network architecture 100.

The interface component 202 is communicatively coupled to a payment processor component 300 that operates to provide push payment decision routing for a payment processor 510 in accordance with the methods described herein with reference to the accompanying drawings.

Figure 3:
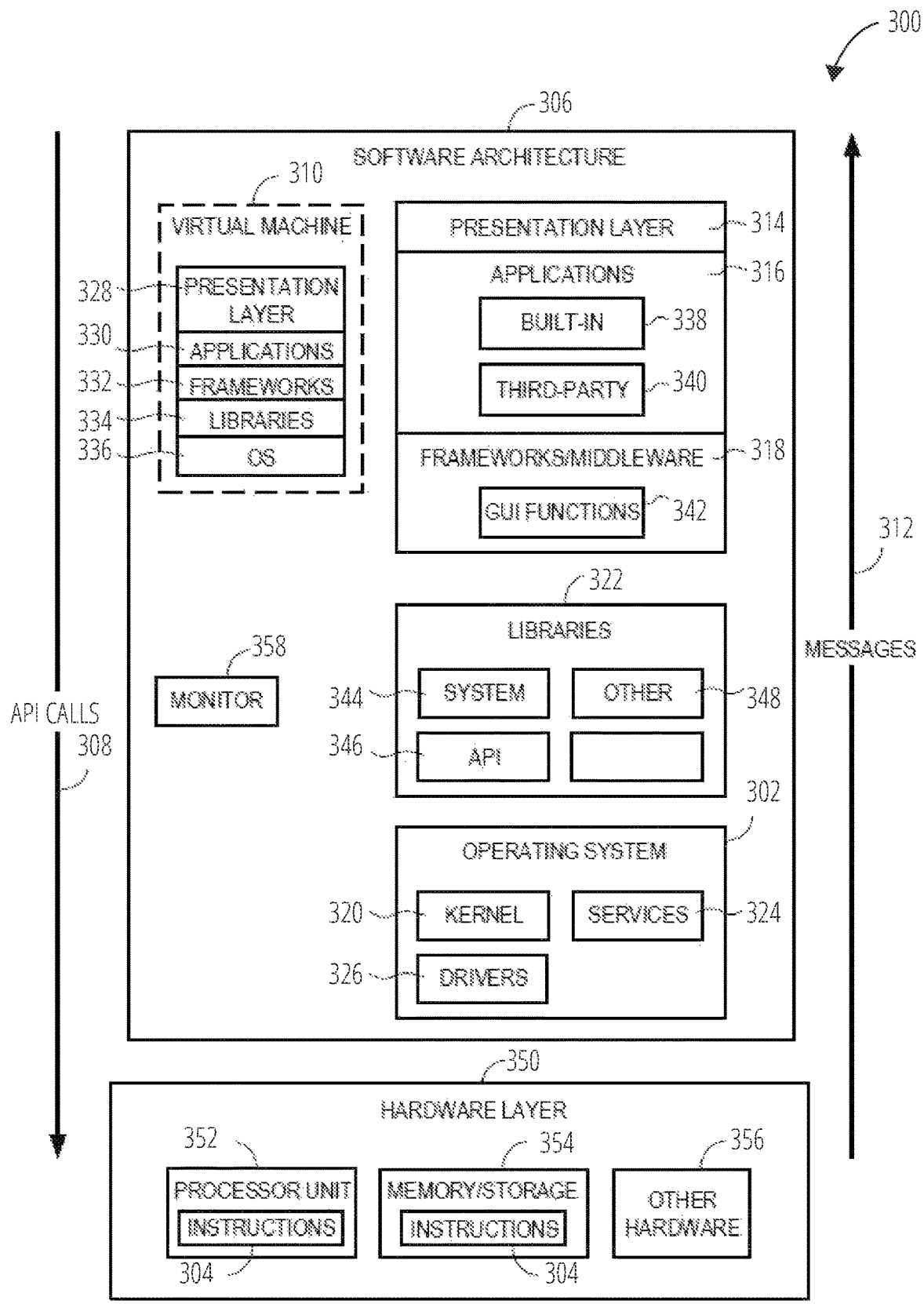
FIG. 3 is a block diagram illustrating a representative software architecture, which may be used in conjunction with various hardware architectures herein described

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 350 is illustrated and can represent, for example, the machine 400 of FIG. 4. The representative hardware layer 350 includes a processor 352 having associated executable instructions 304. The executable instructions 304 represent the executable instructions of the software architecture 306, including implementation of the methods, components, and so forth described herein. The hardware layer 350 also includes memory and/or storage modules as memory/storage 354, which also have the executable instructions 304. The hardware layer 350 may also comprise other hardware 356.

In the example architecture of FIG. 3, the software architecture 306 may be conceptualized as a stack of layers where each layer provides particular functionality. For example, the software architecture 306 may include layers such as an operating system 302, libraries 322, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 320, services 324, and drivers 326. The kernel 320 may act as an abstraction layer between the hardware and the other software layers. For example, the kernel 320 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 322 provide a common infrastructure that is used by the applications 316 and/or other components and/or layers. The libraries 322 provide functionality that allows other software components to perform tasks in an easier fashion than by interfacing directly with the underlying operating system 302 functionality (e.g., kernel 320, services 324, and/or drivers 326). The libraries 322 may include system libraries 344 (e.g., C standard library) that may provide functions such as memory allocation functions, string manipulation functions, mathematical functions, and the like. In addition, the libraries 322 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 322 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built in applications 338 and/or third-party applications 340. Examples of representative built in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 320, services 324, and/or drivers 326), libraries 322, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 358, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
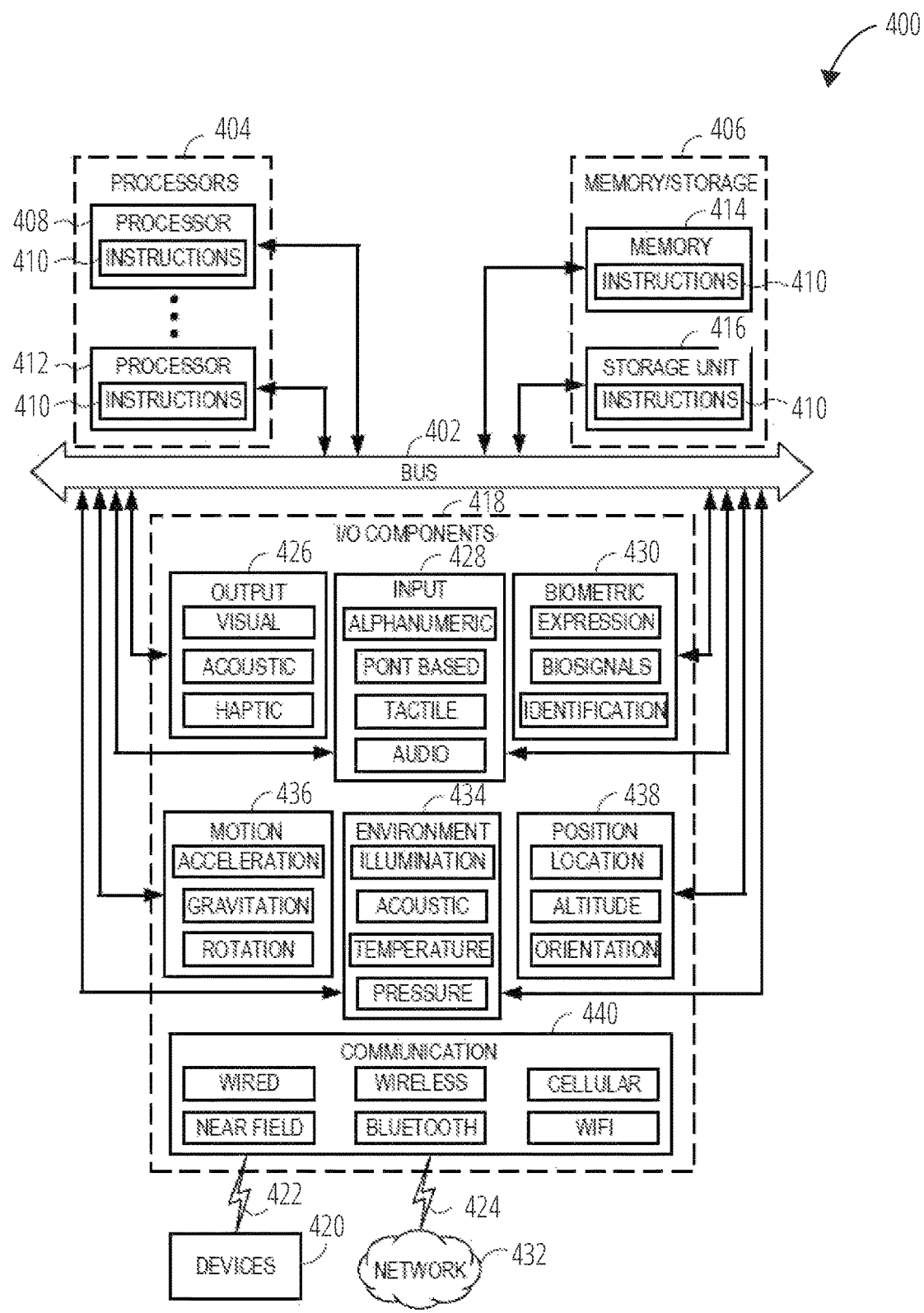
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processor 408 and processor 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 436, environment components 434, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 436 may include acceleration sensor components (e.g., accelerometer), gravitation sensor components, rotation sensor components (e.g., gyroscope), and so forth. The environment components 434 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant 502's checkout form to handle credit card information. When a user attempts to complete a transaction using the checkout form, it sends the credit card information directly from the user's browser to the payment processor 510's servers. The JavaScript library provides merchants 502 with a set of technologies that can be easily and quickly integrated to securely accept payments online. With the JavaScript library, merchants 502 retain full control of their customers' payment flows, but their servers are never exposed to sensitive payment information.

When added to a merchant's payment form, the JavaScript library automatically intercepts the payment form submission, sending payment information directly to the payment processor 510 and converting it to a single-use token. The single-use token can be safely passed to the merchant's systems and used later to charge customers. Merchants 502 have complete control of their customers' payment experience without ever handling, processing, or storing sensitive payment information.

Figure 5:
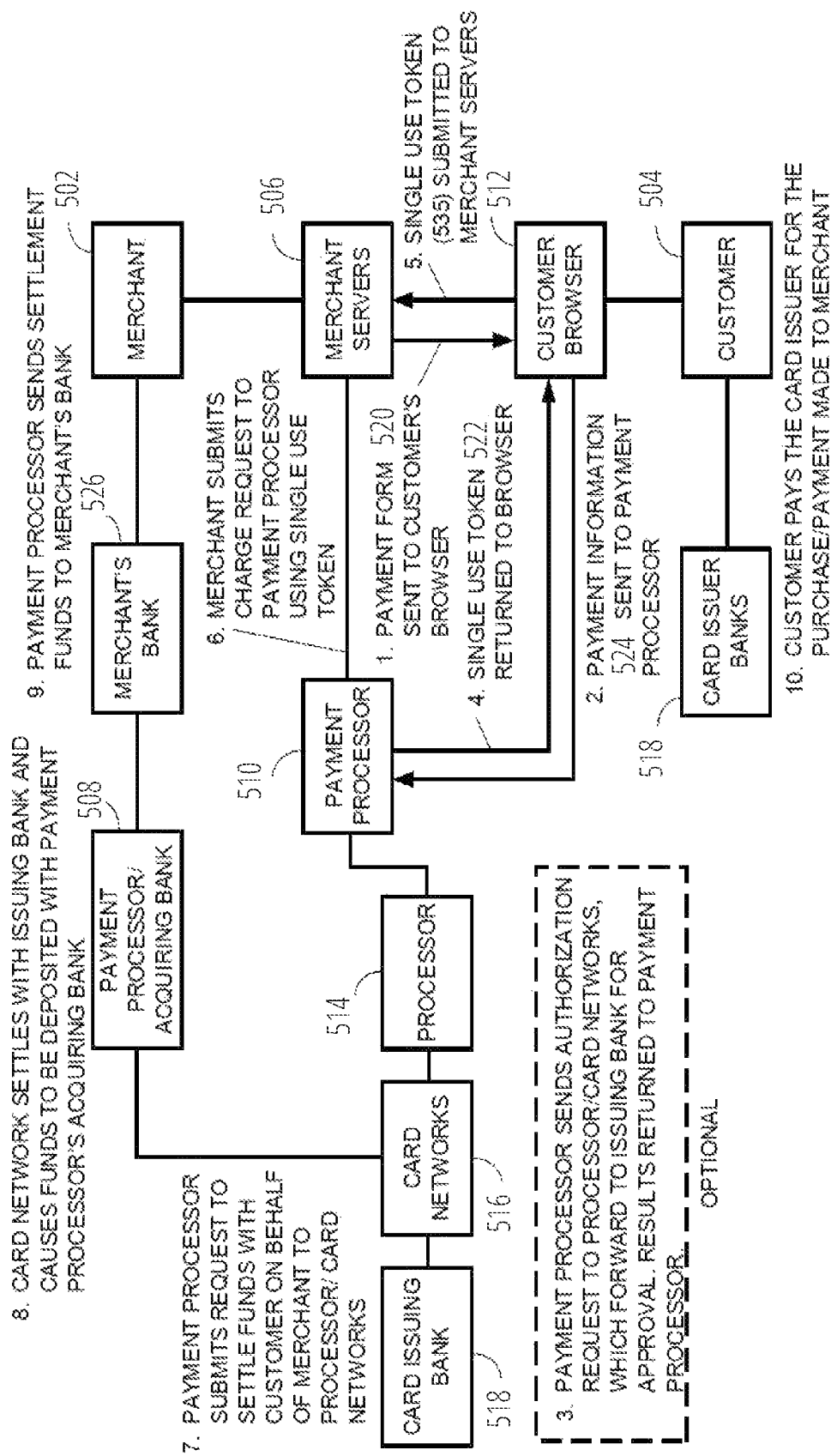
FIG. 5 is a block diagram showing aspects of an online method for conducting a transaction between a merchant site and an electronic user device using a payment processor, according to some example embodiments.

Viewed generally in one example, and with reference to FIG. 5, a payment processing flow is now described:

The merchant's customer 504 uses an Internet-enabled browser 512 to visit the merchant's site. The customer 504 is served a JavaScript library-enabled payment form 520 using standard web technologies. The customer 504 enters the specified information including their payment information 524 and submits the payment form 520. The billing info portion of the payment form 520 is for payment via a credit card or debit card. If payment is to be made via an ACH transaction, the billing info portion of the payment form 520 will request a bank routing number and an account number within that bank, and possibly additional information, such as the bank name and whether the account is a checking or savings account.

The customer's payment information 524 is sent from the customer's browser 512 to the payment processor 510, never touching the merchant servers 506. In this manner, the client-side application electronically sends payment information 524 retrieved from the customer's electronic device to the payment processor 510. The client-side application does not send the payment information 524 to the server-side application.

In one embodiment, the payment processor 510 submits the relevant transaction to a processor 514 or directly to the card network 516 for authorization or validation of the payment information 524. The card network 516 sends the request to the card issuing bank 518, which authorizes the transaction. In this embodiment, the payment processor 510 and the processor 514/card network 516 function together as a payment processor 510. In another example embodiment, this step is performed without any communication to the processor 514/card network 516. Instead, the payment processor 510 performs its own authorization or validation of the payment information 524 using heuristic means, such as by checking the bank identification number (BIN), also referred to as the issuer identification number (IIN), against a database 126 of known, valid BINs on file with the payment processor 510. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information 524 which has not been validated in any way.

If authorized, the payment processor 510 will generate and return a secure, single-use token 522 to the customer's browser 512 that represents the customer's payment information 524 but does not leak any sensitive information. In the example embodiment wherein step (3) is not performed, the payment processor 510 performs this step without waiting to receive authorization from the processor 514 or the card network 516. In this manner, the payment processor 510 creates the token 522 from the payment information 524 sent by the client-side application, wherein the token 522 functions as a proxy for the payment information 524.

The payment form 520 is submitted to the merchant servers 506, including the single-use token 522. More specifically, the payment processor 510 sends the token 522 to the client-side application, which, in turn, sends the token 522 to the server-side application for use by the server-side application in conducting the transaction.

The merchant 502 uses the single-use token 522 to submit a charge request to the payment processor 510 (or to create a customer object for later use). In this step, the payment processor 510 submits a request to authorize the charge to the processor 514 or directly to the card network 516. This authorization specifies the actual amount to charge the credit card. If an authorization was already done in step (3) for the correct amount, this authorization request can be skipped. This may be a one-time payment for a merchant item, or it may involve registering the payment information 524 with the merchant site for subsequent use in making a payment for a merchant item (a so-called "card on file" scenario). Using the process described in steps (1) through (6), the payment information 524 can be used by the server-side application via the token 522 without the server-side application being exposed to the payment information 524.

The payment processor 510 settles the charge on behalf of the merchant 502 with the processor 514 or directly with the card network 516.

The card network 516 causes the funds to be paid by the card issuing bank 518 to the payment processor 510 or to the payment processor's acquiring bank 508.

The payment processor 510 causes the settled funds to be sent to the merchant 502 (or to the merchant's bank 526), net of any applicable fees.

The card issuing bank 518 collects the paid funds from the customer 504.

Not all of the steps listed above need happen in real time. Other examples, arrangements, and functionality are possible. Applicant's published patent application US 2013/0117185 A1 is incorporated by reference in its entirety in this regard. Typically, when the merchant's customer 504 submits the payment form 520 in step (1), steps (1) through (6) happen in real time and steps (7) through (10) happen later, usually once per day, as a batch process settling all of the funds for all of the payment processor 510's merchants 502. In some examples, the payment processor 510 uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor 510 (acting as a tokenization service) can tokenize the customers 504 of each company and compare the overlap without revealing confidential information to either party. Unique payment tokens can be adapted to enable and facilitate such a tokenization service.

Before accepting payment online with the payment processor 510, an inventory API 612 can check for availability of the ordered product as well as allow for preorders and backorders. The ordered product may be physical (e.g., a pin) and/or virtual, such as software, non-fungible tokens (NFT), etc. Preorders and backorders are both similar in that they allow selling of stock that cannot yet be shipped, and also very different in that sellers use them for different strategies which get reflected in various user interfaces, e.g. preorders to build hype leading up to a new product launch, and backorders to continue selling to customers going to a competitor.

When a product goes out of stock, a merchant may want to do one of three things: stop selling the product; sell an unlimited number of backorders; sell a finite number of backorders. For a preorder, a merchant may want to: sell an unlimited number of preorders or sell a finite number of preorders.

The inventory API 612 has two quantity tracking fields:— 'orderable,' which defines how many times this item can be sold (regardless of if it is physically in stock or not), and may be infinite: and 'in-stock,' which defines how many items are stocked and ready to be fulfilled. Both of these fields can be atomically incremented using a '/v1/inventories/:id/adjust' endpoint. The inventory API 612 also works with an Order API 610, where new Orders automatically decrement from the inventory API 612. Each inventory adjustment is also tracked in a 'InventoryTransaction' object, which serves as a historical audit trail of the movement of inventory. By setting orderable to a value greater than in_stock, merchants can use the inventory API 612 to sell either a preorder or a backorder.

An example of a merchant selling pins using the inventory API 612 will now be provided. Cindy's Llama Pins is a new e-commerce startup using the payment processor 510. Cindy sells a variety of pins and manages the fulfillment (i.e., packing, shipping) herself. Cindy has already created Products and Product Classes to represent the pins being sold. She now creates Inventory objects and updates the Products to have Inventory. The Blue Llama Pin product has 100 units in stock.

```
1 POST/v1/inventories
2 {
3 orderable: 100,
4 in_stock: 100,
5 }
6 =>{
7 id: 'inv_567',
8 object: 'inventory',
9 livemode: true,
10 created: 1610600000,
11 updated: 1610600000,
12 metadata: { },
13
14 orderable: 100,
15 in_stock: 100,
16 }
17
18 POST/v1/products/blue_llama_pin
19 {
20 inventory: 'inv_123',
21 }
22 =>{
23 id: 'blue_llama_pin',
24 inventory: 'inv_123',
25 . . .
26 }
```

Rendering a Product Detail Page

Now that Inventory is fully set up, Cindy wants to render stock status on a product detail pages for her webstore. An example code snippet

```
1 DISPLAY_LOW_STOCK_THRESHOLD=20
2
3 def get_inventory_status (product_id)
4 inventory=Stripe::Product.retrieve({
5 id: product_id,
6 expand: ['inventory' ],
7 }).inventory
8 if inventory.in_stock==0
9 'Out of Stock'
10 elsif inventory.in_stock <DISPLAY_LOW_STOCK_THRESHOLD
11 'Low Stock'
12 else
13 'In Stock'
14 end
15 end
```

Sell Product Using Orders

When the Blue Llama Pin is sold in an Order, both orderable and in_stock on the associated Inventory object are decremented. The Order will show that the corresponding line item is currently in_stock. A low stock alert can be triggered per this code snippet.

```
1 REORDER_LOW_STOCK_THRESHOLD=15
2
3 def handle_low_stock (inventory_from_webhook)
4 return if inventory_from_webhook.in_stock >REORDER_LOW_STOCK_THRESHOLD
5     reorder_from_manufacturer(inventory_from_webhook.id)
6 end
```

When this threshold is breached, she filters Products by inventories to see which Products she needs to order more stock for.

```
1 GET/v1/products ? inventories [ ]='inv_123'
2 =>{
3 object: 'list',
4 . . .
5 }
```

The Blue Llama Pin product is popular and ends up selling out. Orders for Blue Llama Pins are now blocked.

```
1 {
2 id: 'inv_123',
3 orderable: 0,
4 in_stock: 0,
5 . . .
6 }
```

Restock Inventory

A shipment of 200 pins came in and Cindy can now restock Blue Llama Pin.

```
1 POST/v1/inventories/inv_123/restock
2 {
3 quantity: 200,
4 }
5 =>{
6 id: 'inv_123',
7 orderable: 200,
8 in_stock: 200,
9 . . .
10 }
```

Cindy has also set up a "Notify me when back in stock" email signup list on a product detail page. To trigger these emails, she listens to the inventory.quantity.updated webhook. Each time it fires with non-zero quantities, the inventory API 612 or other entity sends out those emails, and can clear out those signups.

```
1 def notify_back_in_stock (inventory_from_webhook)
2 return if inventory_from_webhook.in_stock==0
3
4     emails_to_notify=retrieve_emails_list(inventory_from_webhook.id)
6 if (emails_to_notify.length >0)
7 notify(emails_to_notify, inventory_from_webhook.id)
8 end
9 end
```

Selling Preorders Fulfilled by Third Party Logistics (3PL)

Cindy can no longer pack and ship all her orders herself, so she decides to make use of a third party logistics (3PL) company to handle all of her order fulfillment. Cindy also decides to experiment with selling preorders, and decides on an AlpacaPin as her first preorder-able product. To generate hype for this new product, she decides to only accept 50 preorders. She is reasonably confident that people like alpacas, and places an order of 200 Alpaca Pins with her manufacturer, which will be delivered to the 3PL in a month (at time 1620600000).

Create Inventory in preorder mode

```
1 POST/v1/inventories
2 =>{
3 orderable: 50,
4 in_stock: 0,
5 }
6 =>{
7 id: 'inv_567',
8 object: 'inventory',
9 livemode: true,
10 created: 1610600000,
11 updated: 1610600000,
12 metadata: { },
13
14 orderable: 50,
15 in_stock: 0,
16 }
```

Selling Preorders

When the Alpaca Pin is sold by an Order, the Order decrements orderable on the Inventory corresponding to that line item's product. Because in_stock is zero, the Order tracks that this line item is currently not in_stock.

```
1 POST/v1/orders/order_5/submit { . . . }
2 =>{ . . . }
3
4 // Inventory
5 {
6 orderable: 49,
7 in_stock: 0,
8 . . .
9}
```

Each Order that is generated is mirrored into the 3PL's Orders API. The Alpaca Pins are a hit, and sell out in two days! At this point, new Orders containing any Products referencing this Inventory will be blocked.

```
1 {
2 orderable: 0,
3 in_stock: 0,
4 . . .
5}
```

Increase preorder-able quantity Cindy does not want buzz for her Alpaca Pins to die down and decides to release some 50 more units for preorder.

```
1 POST/v1/inventories/inv_567/adjust
2 {
3 adjust_orderable_quantity: 50,
4}
5 =>{
6 orderable: 50,
7 in_stock: 0,
8 . . .
9}
```

Transition from Preorder to in Stock

A month later, the 200 pins finally arrive at the 3PL. Cindy confirms that it has been received by polling a Warehouse Receiving Order API to see that it has arrived and successfully stocked. She then restocks the inventory API 612.

```
1 // Initial Inventory state
2 {
3 orderable: 0,
4 in_stock: 0,
5 . . .
6}
7
8 POST/v1/inventories/inv_567/restock
9 {
10 quantity: 200,
11}
12 =>{
13 orderable: 200,
14 in_stock: 200,
15 . . .
16}
```

The 3PL sends an order_shipped webhook for each Order it fulfills and a Fulfillment API updates each order's fulfillment status. Doing so creates a Fulfillment, and decrements from the Inventory's in_stock since the in_stock_quantity on the line item was 0.

Accepting Backorders/Increasing Backorder Limits

Cindy's manufacturer tells her that they are confident in their ability to produce more Alpaca Pins. In order to avoid losing customers to her competitor, Cindy decides to start accepting backorders—i.e., continue selling her Alpaca Pins even after they sell out at her 3PL warehouse. Just in case anything goes wrong at her manufacturer's factory, she decides to limit herself to selling up to 100 backorders at a time.

```
1 POST/v1/inventories/inv_567/adjust
2 {
3 adjust_orderable_quantity: 100
4}
5 =>{
6 orderable: 200,
7 in_stock: 100,
8 . . .
9}
```

If Cindy wanted to further increase the number of backorders she can accept, she would use the same/adjust operation as the above.

Reorder Inventory

When an inventory.quantity.updated triggers with a in_stock quantity below her internally configured threshold, Cindy places a new bulk order for 100 units with her manufacturer. Her manufacturer also unfortunately notifies her that they will be retooling their dies after this order, and that they will no longer be able to produce Alpaca Pins.

Selling Backorders

Similar to preorders, the Order tracks each line item that cannot be immediately fulfilled. Cindy decides to allow Orders where a single Product has some mix of in_stock and backordered units—before they pay, she notifies her customer that the entire Order will ship once the backordered units arrive. She could just as easily disallow purchasing Orders that have a mix of backordered and in_stock units, and require the customer to reduce their quantity.

```
1 // Initial Inventory state
2 {
3 orderable: 105,
4 in_stock: 5,
5 . . .
6}
7
8 POST/v1/orders/order_123/submit { . . . }
9 =>{
10 line_items: [{
11 quantity: 10
12}]
13 . . .
14}
16 // Final Inventory state
17 {
18 orderable: 95,
19 in_stock: 0,
20 . . .
21
```

Transition from Backorder to in Stock

The new shipment of 100 Alpaca Pins arrives at the 3PL before any more pins are sold. Cindy once again polls the 3PL's Inventory API to determine how many units are in_stock and sees that there are 100 total_onhand_quantity. As before, the 3PL fulfills the backordered order and notifies Cindy via webhook. Because her manufacturer can no longer produce these pins, she uses the/adjust endpoint instead of/restock when reflecting this in the payment processor 510.

```
1 POST/v1/inventories/inv_567/adjust
2 {
3 in_stock: 100, adjust_
4}
5 =>{
6 orderable: 100,
```

```
7 in_stock: 100,
8 . . .
9}
```
Now that the Alpaca Pins are back in stock, Cindy can fulfill her outstanding Order, order_123, by calling a fulfillment API, which will decrement from in_stock.

User Flow: Selling Products Fulfilled by a Print onDemand Service

One problem with Cindy's business model is that some pins sell quickly and go out of stock while other pins are always in stock. She decides to change her strategy and finds a new Print On Demand partner (API), that uses a blank pin to back many different Products.

Many to One Setup

This is modeled by one Inventory object that is shared across multiple Products.

Cindy creates a new Inventory object, and updates her existing Products to point to this new Inventory

```
1 POST/v1/inventories
2 {
3 orderable: 300,
4 in_stock: 300,
5}
6 =>{
7 id: 'inv_456',
8 orderable: 300,
9 in_stock: 300, 10 . . .
11}
12
13 POST/v1/products/blue_llama_pin
14 {
15 inventory: 'inv_456',
16}
17 => . . .
18
19 POST/v1/products/red_llama_pin
20 {
21 inventory: 'inv_456',
22}
23 => . . .
24
25 POST/v1/products/green_llama_pin
26 {
27 inventory: 'inv_456',
28}
29 => . . .
```
Write Off Inventory Loss Cindy notices that 50 blank pins have a dent in them and cannot be sold. She corrects for this through the Adjust API.

```
1 POST/v1/inventories/inv_456/adjust
2 {
3 adjust_orderable: -50,
4 adjust_in_stock: -50
5}
6 =>{
7 id: 'inv_456',
8 orderable: 250,
9 in_stock: 250,
10 . . .
11}
```

Figure 6:
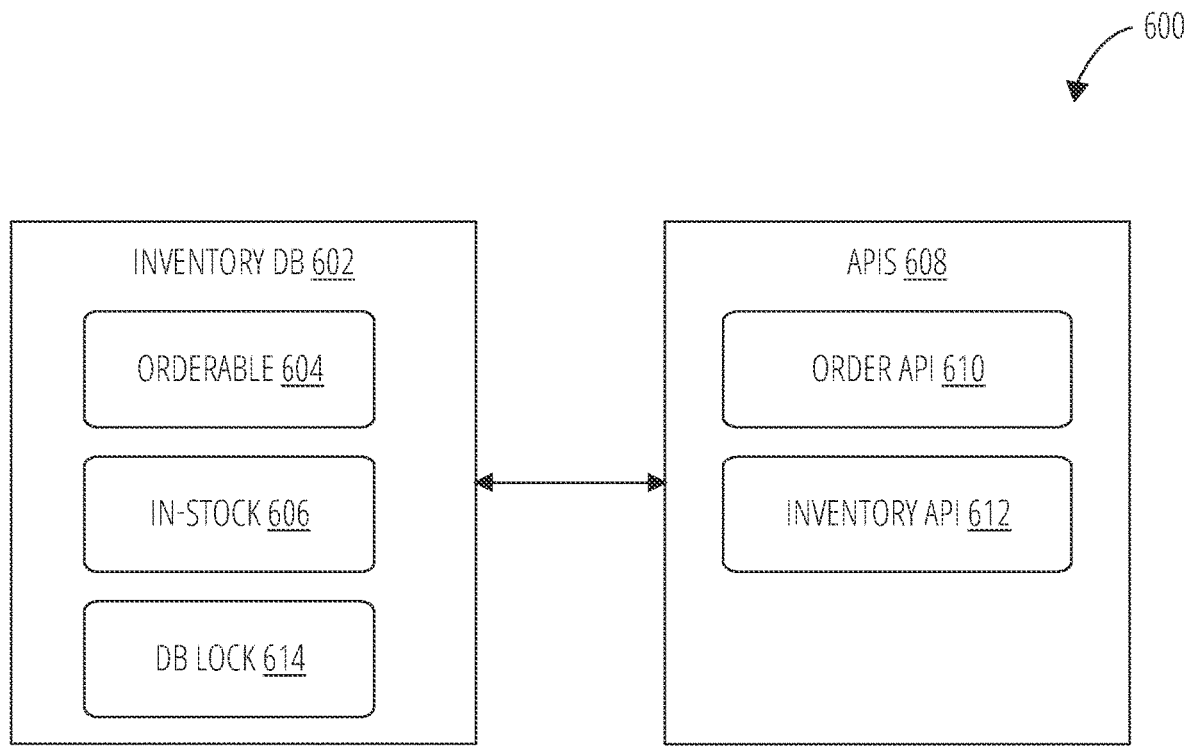
FIG. 6 is a block diagram showing aspects of an inventory system, according to some example embodiments.

FIG. 6 is a block diagram showing aspects of an inventory system according to an example embodiment. The inventory system 600 comprises an Inventory DB 602 and Application Program Interfaces APIs 608. The Inventory DB 602 comprises at least two fields including Orderable 604 and In-stock 606. The APIs 608 comprises order API 610 and an inventory API 612, and DB Lock 614. The Inventory DB 602 will have the following: A DB Lock 614; Orderable 604 and an In-stock 606 which respectively indicate how many units of a product are available for purchase and how many units the merchant has on hand that are uncommitted to the order API 610; a metadata hash also allowing users to specify additional information on Inventory DB 602: and created timestamp fields. By setting Orderable 604 to a value greater than In-stock 606, merchants can use the inventory API 612 to sell either a preorder or a backorder.

The inventory API 612 has the ability to block Orders from the order API 610. When an Order is submitted with a Product that is using the inventory API 612, the order API 610 will attempt to decrement the Orderables 604 and In-stock 606 by the quantity on the line item of an order. If Orderable 604 would go negative, then the Order is blocked, otherwise the Order goes through. If In-stock 606 would stay non-negative, meaning the product is in stock, then the Order line item will show that is is currently in stock. Otherwise, in the case or preorders or backorders, the line item will show that it is awaiting stock.

The DB Lock 614 will lock the Inventory DB 602 so that the inventory API 612 cannot decrement the Orderable 604 or In-stock 606. Locking can be useful when restocking inventory to prevent a race condition with the inventory DB 602. For example, when a merchant is incrementing the In-stock 606 and/or the Orderable 604 an order may come in via the order API 610 causing the inventory API 612 to decrement the In-stock 606 and Orderable 604 simultaneously with the incrementing. By locking the Inventory DB 602 against changes by the inventory API 612, the Inventory DB 602 can be updated properly and orders can then be processed correctly by the order API 610. The APIs 608 will be discussed in more detail in conjunction with FIG. 7.

Note that while the Orderable 604 and In-stock 606 are shown in a database, other locations are possible for these fields.

Figure 7:
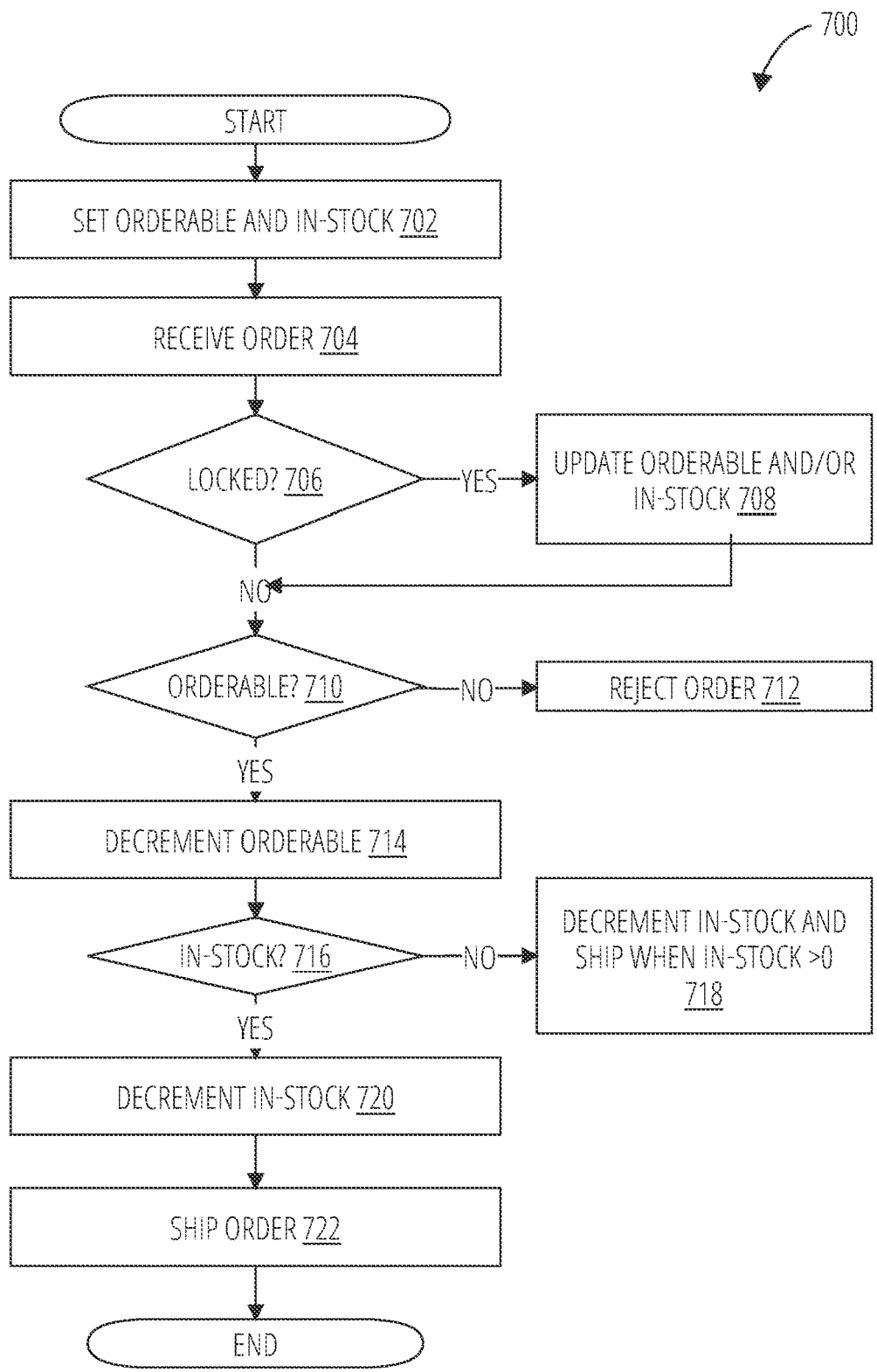
FIG. 7 illustrates a method of preventing race conditions in an inventory database, according to some example embodiments.

FIG. 7 illustrates a method 700 of preventing race conditions in an inventory database. In block 702, a merchant sets Orderable 604 and In-stock 606 in the Inventory DB 602 or other location via, for example, a graphical user interface. In block 704, the order API 610 receives an order for a product related to the Orderable 604 and In-stock 606. In decision block 706, the order API 610 determines if the Inventory DB 602 is locked by the DB Lock 614. In block 708, if the Inventory DB 602 is locked, the In-stock 606 and/or the Orderable 604 is updated. Updating may be done manually by a merchant or automatically, e.g., by communication with a third-party logistics manager or warehouse entity API that tracks newly arrived inventory (e.g., via scanning a tracking mechanism, such as RFID tag, QR code, etc. on a received product or shipment of product). The locking is to prevent a race condition in the Inventory DB 602 so that data in the Inventory DB 602 isn't simultaneously receiving decrements and increments. During the lock, the order is suspended but can be processed once the lock is released. That is, the lock doesn't necessarily reject parallel transactions, but forces a particular order to those transactions so an operation can happen atomically. This means that the first online transaction may be delayed and wait until the lock is no longer held, rather than being immediately rejected.

In decision block 710, if the Inventory DB 602 was not locked (or is now unlocked) or the Inventory DB 602 has been updated and then unlocked, the inventory API 612 determines if the product is orderable. That is, is there enough inventory to fulfil the order (e.g., if the Orderable 604 would go negative if the order was completed). If Orderable 604 indicates insufficient product, then in block 712, the order API 610 rejects the order. Note that the Orderable 604 can be set to unlimited so that it will never go negative. If the Orderable 604 would not go negative, then in block 714, the inventory API 612 decrements orderable by a number specified in the order.

Next, in decision block 716, the inventory API 612 determines if the product is in-stock as indicated by the In-stock 606 being greater than zero (or would not go negative if the order was fulfilled). If not in-stock (e.g., because backordered or preordered), then in block 718, the inventory API 612 decrements in-stock when In-stock 606 returns to >0. Note this can also cause a race condition if a new order arrives during updating the In-stock 606 and so the Inventory DB 602 is locked to the order API 610 when updating the In-stock 606 to account for new product that has arrived. Then the inventory API 612 decrements the In-stock 606 to indicate backordered or preordered products that will be shipped out (so that new orders don't get shipped before backorders or preorders). Otherwise, in block 720, the inventory API 612 decrements In-stock 606 (at the same amount that the Orderable 604 is decremented) and the order is shipped in block 722.

In an example, the method 700 can further comprise generating a historical audit trail of inventory movement based on the decrementing the In-stock 606 (e.g., by keeping a record of each time In-stock 606 has been changed). In another example, the method 700 further comprises transmitting an electronic communication to at least one customer informing the at least one customer of the update in block 708 (e.g., when Orderable 604 is increased so that a rejected order can now be completed).

Note that while the method 700 has been described in relation to an online order, it can be applied to any online transaction, such as accessing a computer network, accessing a computer database, accessing an online subscription service, etc. where access may be limited to a certain number of users (e.g., to prevent slowing the network down).

Accordingly, the method 700 prevents race conditions, such as simultaneous decrementing and incrementing data in the Inventory DB 602, which would otherwise potentially corrupt data in the Inventory DB 602.

In view of the disclosure above, various examples are set forth below. It should be noted that one or more features of an example, taken in isolation or combination, should be considered within the disclosure of this application.

1. A method for preventing race conditions in a database by at least one hardware processor, comprising:
   setting a first entry and a second entry in a database;
   receiving a first online transaction (e.g., request to access a network, database, computer, etc.);
   responsive to determining a lock of the database is in progress, rejecting the first online transaction;
   updating the first entry;
   removing the lock;
   receiving a second online order;
   responsive to determining that the first entry is greater than zero, decrementing the first entry by an amount indicated in the second online transaction; and
   responsive to determining the second entry is greater than zero, decrementing the second entry.
2. The method of example 1, further comprising decrementing the second entry in a same amount that the first entry was decremented.
3. The method of any of the prior examples, wherein the first entry is always equal to or greater than the second entry.
4. The method of any of the prior examples, wherein the first entry represents a back-order quantity.
5. The method of any of the prior examples, wherein the first entry represents a preorder quantity.
6. The method of any of the prior examples, wherein the first entry is set to unlimited.
7. The method of any of the prior examples, further comprising before the removing the lock, updating the second entry.
8. The method of any of the prior examples, further comprising generating a historical audit trail of inventory movement based on the decrementing the first entry.
9. The method of any of the prior examples, further comprising in response to determining the first entry would turn negative if the second online transaction was accepted, rejecting the second online transaction.
10. A non-transitory computer-readable storage medium, the computer-readable storage medium including instructions that when executed by a computer, cause the computer to:
    set an orderable entry and an in-stock entry in a database;
    receive a first online order;
    responsive to determining a lock of the database is in progress, reject the first online order;
    update the orderable entry;
    remove the lock;
    receive a second online order;
    responsive to determining that the orderable entry is greater than zero, decrement the orderable entry by an amount indicated in the second online order; and
    responsive to determining the in-stock entry is greater than zero, decrement the in-stock field.
11. A database system, comprising: one or more hardware processors; and
    a memory storing instructions that, when executed by at least one processor among the processors, cause the system to perform operations comprising, at least:
    setting an orderable entry and an in-stock entry in a database;
    receiving a first online order;
    responsive to determining a lock of the database is in progress, rejecting the first online order;
    updating the orderable entry;
    removing the lock;
    receiving a second online order;
    responsive to determining that the orderable entry is greater than zero, decrementing the orderable entry by an amount indicated in the second online order; and
    responsive to determining the in-stock entry is greater than zero, decrementing the in-stock entry.
12. The system of any of the prior examples, wherein the operations further comprise decrementing the in-stock entry in a same amount that the order entry was decremented.
13. The system of any of the prior examples, wherein the orderable entry is greater than the in-stock entry.
14. The system of any of the prior examples, wherein the orderable entry represents a back order quantity.
15. The system of any of the prior examples, wherein the orderable entry represents a preorder quantity.
16. The system of any of the prior examples, wherein the orderable entry is set to unlimited.
17. The system of any of the prior examples, wherein the operations further comprise generating a historical audit trail of inventory movement based on the decrementing the in-stock entry.

18. The system of any of the prior examples, wherein the operations further comprise before the removing the lock, updating the in-stock entry.

19. The system of any of the prior examples, wherein the operations further comprise in response to determining the orderable entry would turn negative if the second online order was accepted, rejecting the second online order.

20. The database system of any of the prior examples, wherein the operations further comprise in response to removing the lock, processing the first order.

It should also be noted that the above operations and techniques are described as being performed by the payment processor 510 or the APIs 608; however, some or all of the operations may be performed by a different entity, such as by the merchant 502 itself (using, for example, a JavaScript library of functions provided by the payment processor 510).

Some embodiments include machine-readable media including instructions 410 which, when read by a machine 400, cause the machine 400 to perform the operations of any one or more of the methodologies summarized above, or described elsewhere herein.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for preventing race conditions in a database by at least one hardware processor, comprising:
    setting an orderable entry and an in-stock entry for a product in the database;
    receiving an online transaction for the product;
    responsive to determining a lock of the database is in progress, suspending the online transaction;
    updating a quantity of the orderable entry while the lock of the database is in progress;
    removing the lock; and
    responsive to determining that the lock is removed:
        responsive to determining that the quantity of the orderable entry is greater than zero:
            decrementing the quantity of the orderable entry by an amount indicated in the online transaction, and
            determining whether the quantity of the in-stock entry is greater than zero; and
        responsive to determining that the quantity of the orderable entry is greater than zero and that the quantity of the in-stock entry is greater than zero, decrementing the quantity of the in-stock entry by the amount indicated in the online transaction.

2. The method of claim 1, further comprising decrementing the quantity of the in-stock entry in a same amount that the quantity of the orderable entry was decremented.

3. The method of claim 1, wherein the quantity of the orderable entry is always equal to or greater than the quantity of the in-stock entry.

4. The method of claim 1, wherein the orderable entry represents a back-order quantity.

5. The method of claim 1, wherein the orderable entry represents a preorder quantity.

6. The method of claim 1, wherein the orderable entry is set to unlimited.

7. The method of claim 1, further comprising before the removing the lock, updating the in-stock entry.

8. The method of claim 1, further comprising generating a historical audit trail of inventory movement based on the decrementing the in-stock entry.

9. The method of claim 1, further comprising in response to determining the quantity of the orderable entry comprises a value smaller than a quantity of a second online transaction, rejecting the second online transaction.

10. A non-transitory computer-readable storage medium, the computer-readable storage medium including instructions that when executed by a computer, cause the computer to perform operations comprising:
    setting an orderable entry for a product and an in-stock entry for the product in a database;
    receiving an online order for the product;
    responsive to determining a lock of the database is in progress, suspending the online order;
    updating a quantity of the orderable entry while the lock of the database is in progress;
    removing the lock; and
    responsive to determining that the lock is removed:
        responsive to determining that the quantity of the orderable entry is greater than zero:
            decrementing the quantity of the orderable entry by an amount indicated in the online order, and
            determining whether the quantity of the in-stock entry is greater than zero; and
        responsive to determining that the quantity of the orderable entry is greater than zero and that the quantity of the in-stock entry is greater than zero, decrementing the quantity of the in-stock entry by the amount indicated in the online order.

11. A database system, comprising:
    one or more hardware processors; and
    a memory storing instructions that, when executed by at least one processor among the processors, cause the system to perform operations comprising, at least:
    setting an orderable entry for a product and an in-stock entry for the product in a database;
    receiving an online order for the product;
    responsive to determining a lock of the database is in progress, suspending the online order;

updating a quantity of the orderable entry while the lock of the database is in progress;

removing the lock; and responsive to determining that the lock is removed:
  responsive to determining that the quantity of the orderable entry is greater than zero:
    decrementing the quantity of the orderable entry by an amount indicated in the online order, and
    determining whether the quantity of the in-stock entry is greater than zero; and
  responsive to determining that the quantity of the orderable entry is greater than zero and that the quantity of the in-stock entry is greater than zero, decrementing the quantity of the in-stock entry by the amount indicated in the online order.

12. The database system of claim 11, wherein the operations further comprise decrementing the quantity of the in-stock entry in a same amount that the quantity of the orderable entry was decremented.

13. The database system of claim 11, wherein the quantity of the orderable entry is greater than the quantity of the in-stock entry.

14. The database system of claim 11, wherein the orderable entry represents a back order quantity.

15. The database system of claim 11, wherein the orderable entry represents a preorder quantity.

16. The database system of claim 11, wherein the orderable entry is set to unlimited.

17. The database system of claim 11, wherein the operations further comprise generating a historical audit trail of inventory movement based on the decrementing the quantity of the in-stock entry.

18. The database system of claim 11, wherein the operations further comprise before the removing the lock, updating the quantity of the in-stock entry.

19. The database system of claim 11, wherein the operations further comprise in response to determining the quantity of the orderable entry comprises a value smaller than a quantity of a second online order, rejecting the second online order.

20. The database system of claim 11, wherein the operations further comprise in response to removing the lock, processing the online order.

* * * * *